Patented May 23, 1950

2,508,786

UNITED STATES PATENT OFFICE 2,508,786

LACTONES FROM ETIOBILIENIC ACID

Gordon Allison Grant, Montreal, Quebec, and Carl von Seemann, Westmount, Quebec, Canada, assignors to Ayerst, McKenna & Harrison, Limited, Montreal, Quebec, Canada, a corporation of Canada No Drawing. Application April 1, 1948, Serial No. 18,485. In Canada December 22, 1947

14 Claims. (Cl. 260—344.6)

The present invention relates to the preparation of lactones which may be regarded as being derived from $\Delta^{5,6}$-3-$(\beta)$-hydroxy-etiobilienic acid having the following formula:

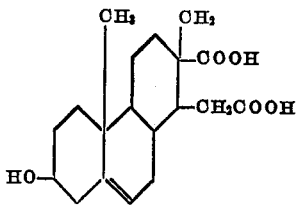

This compound has been prepared by Kuwada (J. Pharm. Soc. Jap. 56, 75 (1936) and ibid. 58, 841 (1938)), by chromic acid $(CrO_3)$ oxidation of cholesteryl acetate dibromide, who also described its acetoxy-anhydride as well as its dimethyl ester and the acetate derived therefrom. Kuwada also introduced the terminology of $\alpha$- and $\beta$-monoalkyl esters of $\Delta^{5,6}$-3-$(\beta)$-hydroxy-etiobilienic acid in analogy with the $\alpha$- and $\beta$-monoalkyl esters of camphoric acid, denoting the esters obtained by acid alkylation of the free acid as the $\alpha$-esters, and those obtained by partial hydrolysis of the dialkylesters as the $\beta$-esters. Both $\alpha$- and $\beta$-esters were prepared by Kuwada, as was also the acetate of the $\beta$-methylester.

In the course of his work on 16-hydroxy-testosterone, Butenandt (Ber. d. Deutsch. Chem. Ges. 72(B), 417 (1939)) isolated $\Delta^{5,6}$-3-$(\beta)$-acetoxy-etiobilienic acid as well as its anhydride, using transdehydroandrosterone (T. D. A.) or its acetate as the starting material.

Wettstein and his collaborators (Helvetica Chim. Acta 24, 332 E(1941), applying their method of oxidation with potassium hypoiodite to T. D. A.-acetate, obtained the anhydride of $\Delta^{5,6}$-3-$(\beta)$-acetoxy-etiobilienic acid as the main product, and the corresponding dimethylester-acetate as a by-product of their reaction.

THE APPLICANTS' DEVELOPMENT

The applicants have now found that new compounds can be derived from the $\alpha$- and $\beta$-mono-alkylesters of $\Delta^{5,6}$-3-$(\beta)$-hydroxy-etiobilienic acid having the general formula $C_{19}H_{28}O_3$ and believed to be one or other of two different lactones and thought to have the following respective formulae:

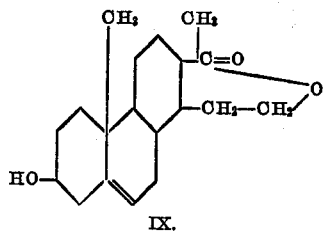

IX.

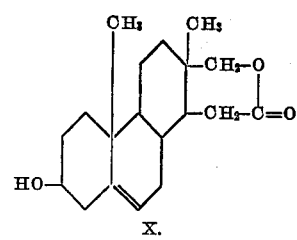

X.

The procedure of the applicants' invention involves the following steps when starting with $\alpha$- and $\beta$-mono-alkylesters of $\Delta^{5,6}$-3-$(\beta)$-hydroxy-etiobilienic acid, preferably having not more than three carbon atoms in the mono-alkyl group, for example the monomethylesters.

1. Protection of the 3-hydroxy group of the mono-alkylester of $\Delta^{5,6}$-3-$(\beta)$-hydroxy-etiobilienic acid by acylation. Protection is preferably accomplished by acylating with a common acylating agent, for example acetic, propionic or butyric anhydride in a solution in a solvent, desirably pyridine.

2. Reaction of the acylated compound obtained as above with a mild halogenating agent to yield the 3-acylated mono-alkylester acid halide, the halogenating agent being preferably oxalyl chloride or thionyl chloride.

3. Reaction of the acid halide obtained as above with a mono functional mercaptan, preferably methyl or benzyl mercaptan to yield the 3-acylated alkyl thiol ester.

4. Treatment of the 3-acylated alkyl thiol ester with Raney nickel under the conditions described by Jeger and his collaborators (Helv. Chim. Acta 29, 684 (1946)) whereby the thiol ester group is reduced, presumably to the corresponding alcoholic group, with concomitant elimination of the alkyl ester group and ring closure to the acylated lactone.

5. Hydrolysis of the acylated lactone to the lactone $C_{19}H_{28}O_3$.

The following flow-sheet shows the general course of the reactions involved in the preparation of the lactones $C_{19}H_{28}O_3$.

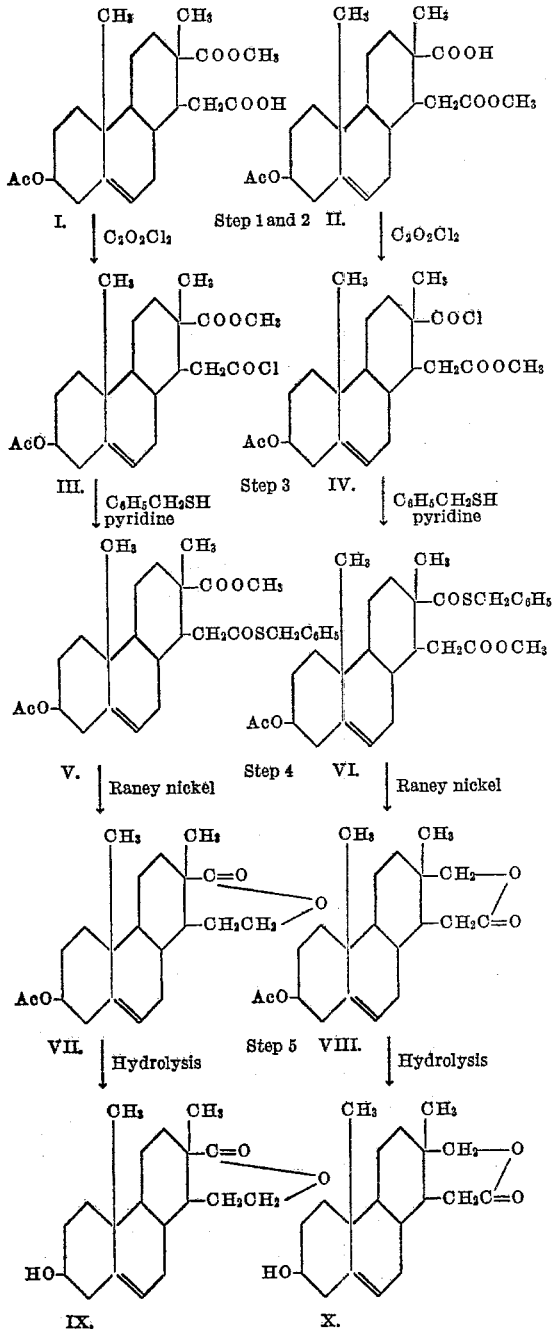

EXAMPLES

In order to illustrate the invention in more detail, the following examples are given of specific procedures. It will be understood that these examples are illustrative only and not to be taken as limiting.

EXAMPLE 1

Preparation of the β-lactone IX (lactone of $\Delta^{9,14}$- 2,13 - dimethyl-1-hydroxyethyl-7(β) - hydroxy-dodecahydrophenanthryl - 2 - carboxylic acid)

STEPS 1 AND 2

3-acetoxy-$\Delta^{5,6}$-etiobilienic α-acid chloride β-monomethylester III

The 3-acetoxy-$\Delta^{5,6}$-etiobilienic acid β-monomethylester (I) obtained by acetylation of the free compound in the usual manner (see also Kuwada, loc. cit.), 6.6 g. is dissolved in 100 cc. dry benzene and 12.5 cc. oxalyl chloride are added. When the violent reaction has subsided, the mixture is kept at 65–75° C. for 45 minutes and then evaporated to dryness in vacuo. The residue is redissolved in 100 cc. benzene, 6.3 cc. oxalyl chloride are added, the mixture kept again at 65–75° C. for 30 minutes and then evaporated in vacuo. Traces of oxalyl chloride are then removed by repeated addition of 25 cc. portions of benzene, each portion being removed in vacuo. The residual acid chloride III (7.21 g.) is placed in a desiccator at high vacuum and allowed to crystallize. It is used for subsequent reactions without further purification.

STEP 3

3-acetoxy-$\Delta^{5,6}$-etiobilienic acid α-thiolbenzyl-β-methylester V

The acid chloride III obtained as in Steps 1 and 2 (7.21 g.) is dissolved in 125 cc. benzene, 10.5 cc. benzyl mercaptan and 2.2 cc. pyridine are added, and the mixture is allowed to stand at room temperature for two days. It is then taken up in 1 litre ether, washed with water, 0.5 N. sodium hydroxide, 0.5 N. sulphuric acid, and finally again with water until neutral. Evaporation after drying yields the crude 3-acetoxy-$\Delta^{5,6}$-etiobilienic acid α-thiolbenzyl-β-methylester V in 85% yield. It is purified by recrystallization from methanol. One such product gave M. P. 111–111.5° C. $(a)_D^{26}$—57.0° in methanol, Calc. for $C_{29}H_{38}O_5S$, C: 69.85%, H: 7.68%, S: 6.43%, Found: C: 68.42, 68.46%; H: 7.28, 7.21%; S: 6.28, 6.21%.

STEP 4

Lactone of $\Delta^{9,14}$-2,13-dimethyl-1-hydroxyethyl-7 (β)-acetoxy-dodecahydrophenanthryl-2-carboxylic acid VII The thiolbenzyl ester V obtained as in Step 3 (1 g.) is dissolved in 100 cc. methanol and stirred for 3 hours with about 10 g. Raney nickel at room temperature. The catalyst is centrifuged off and repeatedly washed with 100 cc. portions of methanol. The methanolic extracts are combined, filtered and evaporated in vacuo, giving a practically theoretical yield of the acetoxy-lactone VII, which is purified by recrystallization from methanol. One such product gave M. P. 185–187° C., $(a)_D^{27}$—73.7° (in $CHCl_3$). Calc. for $C_{21}H_{30}O_4$, C: 72.88%; H: 8.74%, Found: C: 72.93, 72.97%; H: 8.96, 8.78%.

The test for the presence of a double bond with tetranitromethane is positive, and the compound upon treatment with 1 mole bromine in glacial acetic acid yields a dibromide, M. P. 153–154° C. Calc. for $C_{21}H_{30}O_4Br_2$, Br: 31.57%, Found: Br: 31.64, 31.70%.

STEP 5

Lactone of $\Delta^{9,14}$-2,13-dimethyl-1-hydroxyethyl-7(β)-hydroxy-dodecahydrophenanthryl-2-carboxylic acid IX The acetoxy lactone VII as obtained in Step 4 (580 mg.) is refluxed for 2 hours with 40 cc.

1 N potassium hydroxide in 90% methanol, the mixture diluted with ice water, extracted with ether to remove impurities, acidified, extracted with ether, the ether washed, dried and evaporated. After repeated recrystallization from aqueous methanol there are obtained 385 mg. of the lactone IX. One such product gave M. P. 204–206° C., $(\alpha)_D^{27}$—56.5° (in methanol) Calc. for $C_{19}H_{28}O_3$, C: 74.94%; H: 9.28%, Found: C: 74.82, 75.11%; H: 9.02, 9.22%.

Hydrolysis may also be carried out by refluxing VII in 1 N aqueous sodium hydroxide, in which it is insoluble in the cold, but goes slowly in solution upon heating, yielding a product identical in every respect with IX. Acetylation of IX in the usual manner yields the acetoxy-lactone VII.

EXAMPLE 2

*II. Preparation of the α-lactone X (lactone of $\Delta^{9,14}$-2,13-dimethyl-2-hydroxymethyl-7($\beta$)-hydroxy-dodecahydrophenanthryl-1-acetic acid)*

STEPS 1 AND 2

3-acetoxy-$\Delta^{5,6}$-etiobilienic acid-α-methylester-β-acid chloride IV

The α-methylester-3-acetate II as obtained by acetylation of the free compound in the usual manner (8.9 g.) is dissolved in 120 cc. benzene and treated with oxalyl chloride (12 cc. followed by 10 cc.), conducting the reaction and working up as previously described in Steps 1 and 2 of Example 1. A quantitative yield of the acid chloride IV is obtained, which is used for subsequent reactions without further purification.

STEP 3

3-acetoxy-$\Delta^{5,6}$-etiobilienic acid α-methylester-β-thiolbenzylester VI

The acid chloride IV as obtained in the previous Steps 1 and 2 (9.6 g.) is dissolved in 120 cc. benzene, 13.4 cc. benzyl mercaptan and 2.75 cc. pyridine are added and the mixture is allowed to stand at room temperature for 2 days. Working up as previously described in Example 1, Step 3, yields 10.1 g. VI as an oil.

STEP 4

Lactone of $\Delta^{9,14}$-2,13-dimethyl-2-hydroxymethyl-7($\beta$)-acetoxy-dodecahydrophenanthryl-1-acetic acid VIII The crude α-methyl-β-thiolbenzylester acetate VI as obtained in Step 3 (1.63 g.) is dissolved in 150 cc. methanol and stirred at room temperature with about 17 g. Raney nickel for 5 hours. The mixture is worked up as previously described in Step 4 of Example 1, the methanolic filtrates and washings yielding 82% of the crude lactone-acetate VIII, which may be used as such for the subsequent hydrolysis or purified by recrystallization from aqueous methanol. One such lactone-acetate VIII had M. P. 175.5–176° C. $(\alpha)_D^{27}$—132.2° (in methanol) and gave a positive test for the presence of a double bond with tetranitromethane. Calc. for $C_{21}H_{30}O_4$, C: 72.88%; H: 8.74%. Found: C: 72.56, 72.57%; H: 9.02, 8.70%.

STEP 5

Lactone of $\Delta^{9,14}$-2,13-dimethyl-2-hydroxymethyl-7($\beta$)-hydroxy-dodecahydrophenanthryl-1-acetic acid X The lactone-acetate VIII obtained as in the previous Step 4 (0.92 g.) is refluxed 1 hour with 130 cc. 1 N potassium hydroxide in 95% methanol and the mixture worked up as previously described in Step 5 of Example 1. The crude lactone X thus obtained is purified by repeated crystallization from aqueous methanol, yielding 542 mg. lactone X. One such product gave M. P. 199.5–202° C. $(\alpha)_D^{27}$—89.6° (in methanol). Calc. for $C_{19}H_{28}O_3$, C: 74.94%; H: 9.28%, Found: C: 74.69, 74.67%; H: 9.69, 9.43%. The compound gives a strong depression of the melting point when mixed with the lactone IX obtained according to Step 5 of Example 1. Hydrolysis may also be carried out by refluxing VIII in 1 N aqueous sodium hydroxide, in which the compound is insoluble in the cold, but goes slowly in solution upon heating, yielding a product identical in every respect with X. Acetylation of X in the normal manner yields the acetoxy-lactone VIII.

We claim:
1. A process for the preparation of a lactone of the general formula $C_{19}H_{28}O_3$ and possessing a dodecahydrophenanthrene nucleus, comprising, protecting the hydroxyl group of a 3($\beta$)-hydroxy-$\Delta^{5,6}$-etiobilienic acid monoalkyl ester, treating the resulting product with a halogenating agent to obtain the corresponding acid halide alkyl ester, reacting the latter with a mono functional mercaptan to obtain the corresponding thiol ester and conversion to the corresponding lactone.

2. A process for the preparation of a lactone of the general formula $C_{19}H_{28}O_3$ and possessing a dodecahydrophenanthrene nucleus, comprising, acylating a 3($\beta$)-hydroxy-$\Delta^{5,6}$-etiobilienic acid monoalkyl ester, treating the resulting acylated product with a halogenating agent to obtain the corresponding acylated acid halide alkyl ester, reacting the latter with a mono functional mercaptan to obtain the acylated thiol ester, reducing and ring-closing the acylated thiol ester to the acylated lactone, and hydrolyzing the latter to the lactone.

3. A process for the preparation of a lactone of the general formula $C_{19}H_{27}O_3$ acyl and possessing a dodecahydrophenanthrene nucleus, comprising, acylating a 3($\beta$)-hydroxy-$\Delta^{5,6}$-etiobilienic acid monoalkyl ester, treating the resulting acylated product with a halogenating agent to obtain the corresponding acylated acid halide alkyl ester, reacting the latter with a mono functional mercaptan to obtain the acylated thiol ester, and reducing and ring-closing the acylated thiol ester to the acylated lactone.

4. A process, according to claim 2, where the acylating agent is acetic anhydride in pyridine.

5. A process, according to claim 2, where the halogenating agent is oxalyl chloride.

6. A process, according to claim 2, where the mercaptan is benzyl mercaptan.

7. A process, according to claim 2, where the starting monoalkyl ester is 3($\beta$)-hydroxy-$\Delta^{5,6}$-etiobilienic acid $\beta$-mono-methyl ester.

8. A process, according to claim 2, where the starting monoalkyl ester is 3($\beta$)-hydroxy-$\Delta^{5,6}$-etiobilienic acid α-mono-methyl ester.

9. A process, according to claim 2, wherein the reduction and ring-closure is carried out in the presence of Raney nickel as a catalyst.

10. A lactone of $\Delta^{9,14}$-2,13-dimethyl-1-hydroxyethyl-7($\beta$)-acetoxy-dodecahydrophenanthryl-2-carboxylic acid.

11. A lactone of $\Delta^{9,14}$-2,13-dimethyl-1-hydroxyethyl-7($\beta$)-hydroxy-dodecahydrophenanthryl-2-carboxylic acid.

12. A lactone of $\Delta^{9,14}$-2,13-dimethyl-2-hydroxymethyl-7($\beta$)-acetoxy-dodecahydrophenanthryl-1-acetic acid.

13. A lactone of $\Delta^{9,14}$-2,13-dimethyl-2-hydroxymethyl-7($\beta$)-hydroxy-dodecahydrophenanthryl-1-acetic acid.

14. A lactone of a $\Delta^{9,14}$-2,13-dimethyl-7($\beta$) oxy-dodecahydrophenanthrene compound, the lactone grouping consisting of a $C_3H_4O_2$ group bridging the 1 and 2 positions, one carbon of said group being attached to the ring carbon in the 1 position and another carbon of said group being attached to the ring carbon in the 2 position.

GORDON ALLISON GRANT.
CARL von SEEMANN.

REFERENCES CITED

The following references are of record in the file of this patent:

Doisy, Endocrinology, V. 30, 1942, pages 933 and 936.

Jeger et al., Helvetica Chimica Acta, V. 29, 1946, pages 684 to 687.

Levy et al., Journal of Biol. Chem., November 1947, pages 71, 72.

Certificate of Correction

Patent No. 2,508,786   May 23, 1950

GORDON ALLISON GRANT ET AL.

It is hereby certified that errors appear in the printed specification of the above numbered patent requiring correction as follows:

Column 1, line 5, in the formula, for "CH$_3$" read $CH_3$; column 2, lines 5 to 10, inclusive, for that portion of the formula reading

and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*